United States Patent [19]

Johnson, Jr.

[11] 3,825,894

[45] July 23, 1974

[54] SELF-CHECKING PARITY CHECKER FOR TWO OR MORE INDEPENDENT PARITY CODED DATA PATHS

[75] Inventor: Allen M. Johnson, Jr., Endwell, N.Y.

[73] Assignee: International Business Machines Corporation, Armonk, N.Y.

[22] Filed: Sept. 24, 1973

[21] Appl. No.: 400,451

[52] U.S. Cl. ............... 340/146.1 AG, 235/153 BG, 340/146.1 BE

[51] Int. Cl. ......................... H04l 1/10, G06f 11/10

[58] Field of Search .... 235/153 BG; 340/146.1 AG, 340/146.1 BE

[56] References Cited

UNITED STATES PATENTS

| | | | |
|---|---|---|---|
| 3,602,886 | 8/1971 | Carter et al. | 340/146.1 AG |
| 3,634,662 | 1/1972 | Carter et al. | 235/153 BG |

OTHER PUBLICATIONS

Carter, W. C. et al., "Self-Testing Partially-Checked Decoder Checking Circuit" In IBM Tech. Disc. Bull. 13(10) May 1971, p. 3881–3883.

Bouricius et al., "Self-Testing Logic Functions for Control of Encoder and Self-Repairing Computer Subunits" In IBM Tech. Disc. Bull. 14(1): June 1971, p. 276–280.

Carter W. C., "Totally Self-Checking Error Checker for K out of N Coded Data" In IBM Tech. Disc. Bull. 15(12) May 1973, p. 3867–3870.

*Primary Examiner*—Malcolm A. Morrison
*Assistant Examiner*—R. Stephen Dildine, Jr.
*Attorney, Agent, or Firm*—John C. Black

[57] ABSTRACT

A series of self-checking error checking circuits are disclosed for checking two or more independent sets of parity coded data lines. Each data signal set includes any logical combination of binary "1's" and "0's" and at least one parity bit. Each checking circuit comprises two Exclusive-OR tree circuits wherein each tree obtains its inputs from different input lines of each set of independent data lines whereby complementing outputs are produced by the two tree circuits for any correct signal set when the checker is error free. Any error in the data will cause the two outputs to be the same. Malfunctions or failures in the checking circuit are checked by certain legitimate code signals which similarly cause an error representation in the output of the checker.

8 Claims, 4 Drawing Figures

$P = A\bar{B}\bar{C} + \bar{A}B\bar{C}, \bar{A}\bar{B}C + ABC$

SELF-CHECKING PARITY CHECKER FOR TWO OR MORE INDEPENDENT PARITY CODED DATA PATHS

BACKGROUND OF THE INVENTION

As present day electronic computers become evermore complex and sophisticated, the number of circuits has increased to very large proportions with a concurrent reduction in time for performing a given computation. With this large increase in the total number of circuits in today's modern complex computing systems, it will be apparent that the number of locations in which an error or fault can occur, has been greatly multiplied. Moreover, if a given faulty component is producing incorrect data, a great many errors or incorrect computations can be produced within a very short space of time until the fault is detected.

In the past many schemes have been proposed for detecting errors in various sections of a computing system. Probably the most widespread is the use of parity checking wherein an extra bit or bits accompany the transmitted data bits and are utilized to indicate the proper data content of a particular transmission, i.e., normally the parity bit indicates whether an odd or even number of "1's" appears in the data transmission proper. However, for such parity checking systems, means must be provided for detecting and generating the proper parity bits at various transmission points within the computer and additional means must be provided for checking the parity. In the past most checking systems have not themselves been checkable during normal data processing. In other words, if the checker failed so as to indicate an "error free" condition, subsequent errors would obviously go undetected until some other means picked up the system error.

The increasingly greater load must be borne by the service representatives who have the responsibility of maintaining and repairing computers. Any reliable diagnostic circuits built into a computer system are of invaluable aid, both in terms of indicating that an error is present in the system and wherever possible the precise location of the faulty hardware. In the past the provision of large amounts of error detection circuitry has been considered prohibitive in terms of hardware cost. However, with the vastly more complex present day computers and the extreme difficulty in obtaining and training qualified service personnel, the alternative of reliable diagnostic equipment and circuitry built into the computer is becoming more attractive.

Further, the advent of integrated circuit technology is rapidly reducing the cost of individual circuit blocks to the point where heretofore financially unfeasible hardware installed for the purpose of error detection and correction looks more attractive.

It will be apparent from the following description of the present invention that the primary concern hereof is the provision of hardware for the detection of errors occurring within a computing system, both function circuits and checking circuits. The particular use made of the error detection information, once obtained, forms no part of the present invention and accordingly will not be specifically spelled out. However, it will be obvious to one skilled in the art that such information could readily be used for either automatic repair or for merely giving indications to appropriate service personnel for diagnostic and repair purposes.

DESCRIPTION OF THE PRIOR ART

Reference is hereby made to U.S. Pat. No. 3,602,886 of W. C. Carter and P. R. Schneider entitled "Self-Checking Error Checker for Parity Coded Data"; to U.S. Pat. No. 3,559,167 of W. C. Carter, K. A. Duke and P. R. Schneider, entitled "Self-Checking Error Checker for Two-Rail Coded Data"; and to U.S. Pat. No. 3,559,168 of W. C. Carter, K. A. Duke and P. R. Schneider, entitled "Self-Checking Error Checker for *k*-Out-Of-*n* Coded Data" for a description of three generally similar types of self-checking checkers. The self-checking checkers of all of these patents have certain characteristics in common and the cross reference of these patents may be helpful for a better understanding of the principles and operation of this application.

Hitherto, a parity check circuit consisted of either a single output non-self-checking "Exclusive-OR" tree or two self-checking "Exclusive-OR" trees for each data path. Since the inputs to the single output "Exclusive-OR" tree normally constitute only code messages, it is not possible to fully exercise such a tree; and in particular the circuit generating the final output is not testable during normal operation. Two trees are required for this self-checking function. If two "Exclusive-OR" trees are utilized for each data path, as shown in U.S. Pat. No. 3,602,886, the number of additional circuits and outputs required compared to the circuits and outputs required in the utilization of conventional single output "Exclusive-OR" trees increases rapidly with the number of independent data paths to be checked.

It is the primary object of the present invention to minimize the number of outputs (and circuits) as the number of independent data paths increases.

SUMMARY OF THE INVENTION

It has been found that a self-checking checker can be provided for two or more independent sets of parity coded data lines by utilizing only two single output Exclusive-OR logic trees connected to nonoverlapping groups of input data wherein every line is included in one of said groups and at least one line from each independent data set is included in each tree. This is particularly important in large scale integration environments where several sets of lines may be fabricated on one semiconductor chip which has limited input/output pins.

As stated previously, parity coding has long been a popular method of detecting malfunctions of data paths in computer systems. The technique consists of adding one binary digit, the check bit, to each binary coded message or word and setting its value such that the parity of "1's" in the message is unchanged, i.e., the number of "1's" in all messages is odd or the number of "1's" in all messages is even. A change in value of any single bit in a message will clearly change its parity and will result in changing a code message particularly powerful in situations where the individual bits of a message are generated independently or transmitted over independent paths (i.e., such that a single failure only affects the status of an individual bit in a message). Odd parity codes are more commonly used than even parity codes because of the tendency of failures common to every bit to produce an "all zero" result which has even parity and thus is detectable only as an odd parity error. Odd parity codes will be assumed in the subsequent description for convenience, although the principles of the checkers to be described apply equally to even parity codes.

The self-testing checking circuits proposed by the present invention have three primary characteristics: (1) The checker output distinguishes the presence of code message inputs and error message inputs, i.e., code message inputs produce one set of checker outputs and error message inputs produce a completely different (disjoint) set of checker outputs. (2) For every given failure in the checking circuit there exists at least one code message input which tests for that given failure, i.e., given the failure, when the proper code message is applied, the checker will produce an output different from that produced when the code message is applied to a correct functioning checking circuit. (3) Each data path input influences the value of every output from the checking circuit such that no more than two outputs are required to satisfy the first and second characteristics for two or more independent data paths. The first characteristic insures that the checking circuit can be used to detect the presence of error messages. The second characteristic insures that the checking circuit is completely self-testing during the normal processing of code messages. The third characteristic reduces the number of circuits and outputs required to the independent data paths. This is particularly valuable in Large Scale Integration circuits for easing the circuit and I/O pin requirements for implementing independent data paths that may exist on the same physical chip or wafer. Special mechanisms to test for the correct operation of the checking circuitry are eliminated.

These three characteristics require that the checking circuits have more than one output but they do not require more than two outputs even though more than one data path is involved. If only one output existed, the first characteristic would require that the output take on one value, say 1, for code messages and the opposite value, say 0, for error messages. But then the second characteristic could not be satisfied since the checker output could fail in the stuck-at-1 position and application of code messages would never detect this failure. It should be noted that this failure also disables all future error detection ability, thus more than one output is mandatory.

For simplicity of discussion, each checking circuit to be described in detail here will have just two outputs. These two outputs satisfy the first characteristic by becoming either "01" or "10" for code message inputs and either "00" or "11" for error message inputs. Given a failure in the checking circuit, the second characteristic is satisfied by having at least one code message test for this given failure by producing either a "00" or "11" output if the failure exists. The third characteristic is evidenced by the fact that only two outputs are required as outputs from the checking circuit to input to the error checking means and the value of each output is influenced by every independent data path that is inputting to the checking circuit.

It is accordingly a primary object of the present invention to provide an error checking circuit which is itself testable.

It is a further object to provide such a checking circuit for use to test two or more independent sets of parity-coded data.

It is another object to provide a checking circuit having each output influenced by at least one data line from each independent data set input.

It is yet another object to provide such a checking circuit having at least two different outputs (i.e. 01 or 10) when an error free condition is present.

It is a still further object to provide such a checking circuit which produces a readily discernible output signal whenever an error is detected in the coded data or the checker itself is defective.

It is a further object to provide such a checking circuit constructed of two logic trees wherein the final output of each tree is a single binary function.

It is another object to provide such a checking circuit constructed of conventional logic blocks.

It is another object to provide such a checking circuit in one embodiment wherein the entire checker is constructed of two input, single output Exclusive-OR circuits.

It is another object to provide such a checking circuit in another embodiment wherein the entire checker is constructed of two-rail, three-input, complementary output Exclusive-OR tree circuits.

The objects of the present invention are accomplished in general by a self-checking error checker for checking two or more independent sets of parity coded binary data. The checker includes two Exclusive-OR trees connected to the data lines in each set, said data lines in each set preferably being divided into a like number of non-overlapping groups, each tree being connected to the data lines of a different group in each set where the groups are non-overlapping.

In the preferred embodiment for two independent data paths, two such trees are employed. The second and last stage of each tree has as its input three subtrees; and, assuming an error free code and a properly functioning checker, the outputs of the two trees are complements of each other.

Circuits can be utilized which are the logical equivalent of the Exclusive-OR trees.

In a further embodiment, two or more two-rail three-input Exclusive-OR trees (six inputs and two outputs) are provided, each of the said Exclusive-OR trees being connected to the lines of a different group of parity coded input data lines from each set.

The foregoing and other objects, features and advantages of the invention will be apparent from the following more particular description of preferred embodiments of the invention, as illustrated in the accompanying drawings.

DESCRIPTION OF THE PREFERRED EMBODIMENTS

Figure 1:
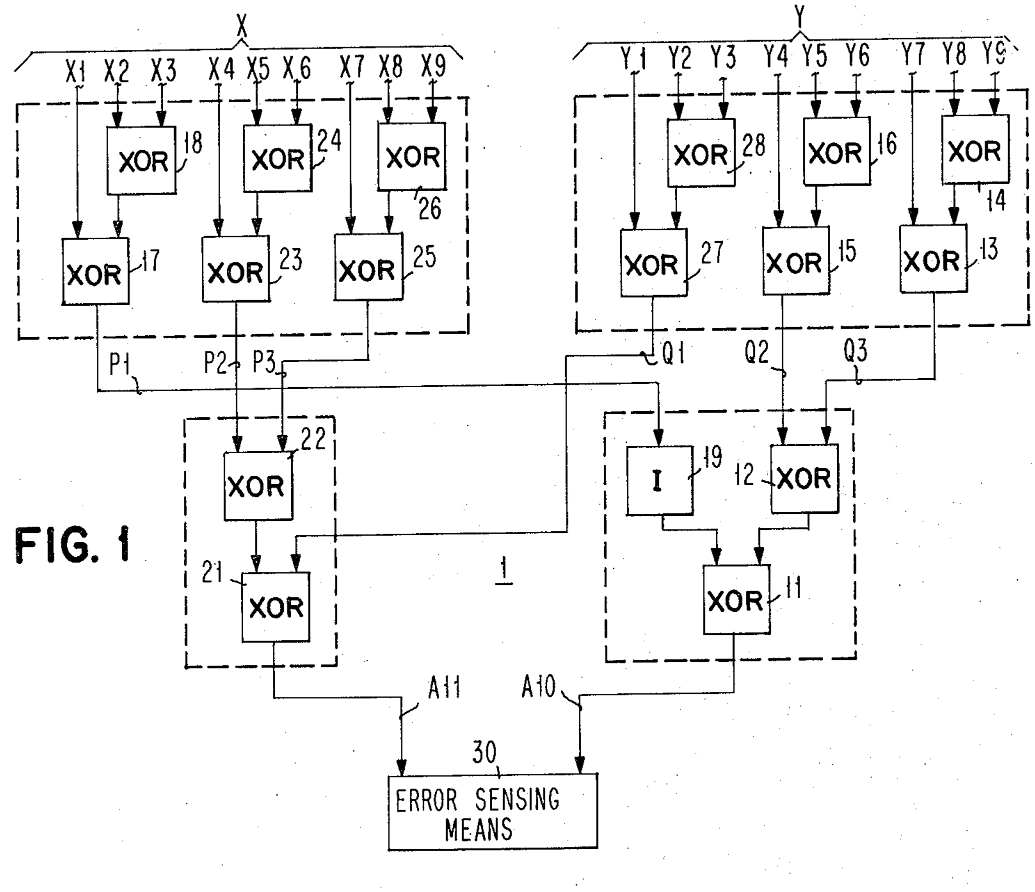
FIGS. 1 and 2 are schematic diagrams of preferred embodiments for two and three independent data sets, respectively, each using two-input Exclusive-OR (XOR) circuit trees.

The preferred embodiment of the self-checking parity checkers 1 for two independent 9-bit (8 data bits plus a parity bit) data paths X and Y is shown in FIG.

1. Odd parity checking is assumed. The checker 1 includes two XOR trees with outputs A10 and A11. The first tree includes XOR circuits 11–18 and invert circuit 19. The second tree includes XOR circuits 21–28. The inputs X1–X3 of data paths X, and inputs Y4–Y6 and Y7–Y9 of data path Y produce intermediate outputs P1, Q2, Q3, which outputs in turn produce the final output A10. Similarly, inputs X4–X6, X7–X9 and Y1–Y3 produce intermediate outputs P2, P3 and Q1, which outputs in turn produce the final output A11.

The outputs A10 and A11 form inputs to a self-checking error checker 30 for two-rail coded data, preferably of the type shown in U.S. Pat. No. 3,559,167 issued Jan. 26, 1971, to W. C. Carter et al. Briefly, the checker 30 determines whether or not each input pair is correctly at the logical 1, 0 or 0, 1 states; and, it indicates an error condition if its inputs are 00 or 11.

Table 1 below illustrates the circuit response of the XOR subtree 17, 18 to all possible input patterns to inputs X1, X2, X3 to produce output P1. Corresponding XOR subtrees having outputs P2, P3, Q1, Q2, Q3 respond to their input patterns similarly.

TABLE 1

| X1 | X2 | X3 | P1 |
|---|---|---|---|
| 0 | 0 | 0 | 0 |
| 0 | 1 | 1 | 0 |
| 1 | 0 | 1 | 0 |
| 1 | 1 | 0 | 0 |
| 0 | 0 | 1 | 1 |
| 0 | 1 | 0 | 1 |
| 1 | 0 | 0 | 1 |
| 1 | 1 | 1 | 1 |

Table 2 below illustrates the circuit response to all possible patterns of P1–P3 and Q1–Q3 to produce outputs A10 and A11. The table is divided into correct code space and error code space. It can be seen that P1–P3 and Q1–Q3 should each always have an odd number of logical states which produce error-free output states 01 or 10 at A10 and A11. Error code produces outputs 00 or 11. An X in the table indicates a "don't care" condition, i.e., the value can be either logical 0 or 1.

TABLE 2

| | P1 | P2 | P3 | Q1 | Q2 | Q3 | A10 | A11 |
|---|---|---|---|---|---|---|---|---|
| | 0 | 0 | 1 | 0 | 0 | 1 | 0 | 1 |
| | 0 | 0 | 1 | 0 | 1 | 0 | 0 | 1 |
| | 0 | 0 | 1 | 1 | 0 | 0 | 1 | o |
| | 0 | 0 | 1 | 1 | 1 | 1 | 1 | 0 |
| CODE | 0 | 1 | 0 | 0 | 0 | 1 | 0 | 1 |
| SPACE | 0 | 1 | 0 | 0 | 1 | 0 | 0 | 1 |
| | 0 | 1 | 0 | 1 | 0 | 0 | 1 | o |
| | 0 | 1 | 0 | 1 | 1 | 1 | 1 | 0 |
| | 1 | 0 | 0 | 0 | 0 | 1 | 1 | 0 |
| | 1 | 0 | 0 | 0 | 1 | 0 | 1 | 0 |
| | 1 | 0 | 0 | 1 | 0 | 0 | 0 | 1 |
| | 1 | 0 | 0 | 1 | 1 | 1 | 0 | 1 |
| | 1 | 1 | 1 | 0 | 0 | 1 | 1 | 0 |
| | 1 | 1 | 1 | 0 | 1 | 0 | 1 | o |
| | 1 | 1 | 1 | 1 | 0 | 0 | 0 | 1 |
| | 1 | 1 | 1 | 1 | 1 | 1 | 0 | 1 |
| | 0 | 0 | 0 | 0 | X | X | 0 | 0 |
| ERROR | 0 | 0 | 0 | 1 | X | X | 1 | 1 |
| CODE | 0 | 1 | 1 | 0 | X | X | 0 | 0 |
| | 0 | 1 | 1 | 1 | X | X | 1 | 1 |
| | 1 | 0 | 1 | 0 | X | X | 1 | 1 |
| | 1 | 0 | 1 | 1 | X | X | 0 | 0 |
| | 1 | 1 | 0 | 0 | X | X | 1 | 1 |
| | 1 | 1 | 0 | 1 | X | X | 0 | 0 |

Table 3 below illustrates the circuit response of checker 1 to all possible input patterns. This table is also divided into correct code space and error code space. For example, the response 00100101 for P1, P2, P3, Q1, Q2, Q3, A10, A11 of the first group can be produced by $4^6$ input combinations. The first input combination X1–X9, Y1–Y9 is 000,000,001,000,000,001; the second 000,011,001,000,000,001; the third 000,101,001,000,000,001, etc.

TABLE 3

| CODE SPACE (16 × $4^6$) | | | | | | | | | |
|---|---|---|---|---|---|---|---|---|---|
| X 1–3 | X 4–6 | X 7–9 | Y 1–3 | Y 4–6 | Y 7–9 | P 1–3 | Q 1–3 | A 10 | A 11 |
| 000 | 000 | 001 | 000 | 000 | 001 | 001 | 001 | 0 | 1 |
| 011 | 011 | 010 | 011 | 011 | 010 | | | | |
| 101 | 101 | 100 | 101 | 101 | 100 | | | | |
| 110 | 110 | 111 | 110 | 110 | 111 | | | | |
| 000 | 000 | 001 | 000 | 001 | 000 | 001 | 010 | 0 | 1 |
| 011 | 011 | 010 | 011 | 010 | 011 | | | | |
| 101 | 101 | 100 | 101 | 100 | 101 | | | | |
| 110 | 110 | 111 | 110 | 111 | 110 | | | | |
| 000 | 000 | 001 | 001 | 000 | 000 | 001 | 100 | 1 | o |
| 011 | 011 | 010 | 010 | 011 | 011 | | | | |
| 101 | 101 | 100 | 100 | 101 | 101 | | | | |
| 110 | 110 | 111 | 111 | 110 | 110 | | | | |
| 000 | 000 | 001 | 001 | 001 | 001 | 001 | 111 | 1 | 0 |
| 011 | 011 | 010 | 010 | 010 | 010 | | | | |
| 101 | 101 | 100 | 100 | 100 | 100 | | | | |
| 110 | 110 | 111 | 111 | 111 | 111 | | | | |
| 000 | 001 | 000 | 000 | 000 | 001 | 010 | 001 | 0 | 1 |
| 011 | 010 | 011 | 011 | 011 | 010 | | | | |
| 101 | 100 | 101 | 101 | 101 | 100 | | | | |
| 110 | 111 | 110 | 110 | 110 | 111 | | | | |
| 000 | 001 | 000 | 000 | 001 | 000 | 010 | 010 | 0 | 1 |
| 011 | 010 | 011 | 011 | 010 | 011 | | | | |
| 101 | 100 | 101 | 101 | 100 | 101 | | | | |
| 110 | 111 | 110 | 110 | 111 | 110 | | | | |
| 000 | 001 | 000 | 001 | 000 | 000 | 010 | 100 | 1 | 0 |
| 011 | 010 | 011 | 010 | 011 | 011 | | | | |
| 101 | 100 | 101 | 100 | 101 | 101 | | | | |
| 110 | 111 | 110 | 111 | 110 | 110 | | | | |
| 000 | 001 | 000 | 001 | 001 | 001 | 010 | 111 | 1 | 0 |
| 011 | 010 | 011 | 010 | 010 | 010 | | | | |
| 101 | 100 | 101 | 100 | 100 | 100 | | | | |
| 110 | 111 | 110 | 111 | 111 | 111 | | | | |

TABLE 3 – Continued

| X 1–3 | X 4–6 | X 7–9 | Y 1–3 | Y 4–6 | Y 7–9 | P 1–3 | Q 1–3 | A 10 | A 11 |
|---|---|---|---|---|---|---|---|---|---|
| CODE SPACE (16 × 4⁶) | | | | | | | | | |
| 001 010 100 111 | 000 011 101 110 | 000 011 101 110 | 000 011 101 110 | 000 011 101 110 | 001 010 100 111 | 100 | 001 | 1 | 0 |
| 001 010 100 111 | 000 011 101 110 | 000 011 101 110 | 000 011 101 110 | 001 010 100 111 | 000 011 101 110 | 100 | 010 | 1 | 0 |
| 001 010 100 111 | 000 011 101 110 | 000 011 101 110 | 001 010 100 111 | 000 011 101 110 | 000 011 101 110 | 100 | 100 | 0 | 1 |
| 001 010 100 111 | 000 011 101 110 | 000 011 101 110 | 001 010 100 111 | 001 010 100 111 | 001 010 100 111 | 100 | 111 | 0 | 1 |
| 001 010 100 111 | 001 010 100 111 | 001 010 100 111 | 000 011 101 110 | 000 011 101 110 | 001 010 100 111 | 111 | 001 | 1 | 0 |
| 001 010 100 111 | 001 010 100 111 | 001 010 100 111 | 000 011 101 110 | 001 010 100 111 | 000 011 101 110 | 111 | 010 | 1 | 0 |
| 001 010 100 111 | 001 010 100 111 | 001 010 100 111 | 001 010 100 111 | 000 011 101 110 | 000 011 101 110 | 111 | 100 | 0 | 1 |
| 001 010 100 111 | 001 010 100 111 | 001 010 100 111 | 001 010 100 111 | 001 010 100 111 | 001 010 100 111 | 111 | 111 | 0 | 1 |
| ERROR CODE (32×4⁶) | | | | | | | | | |
| 000 011 101 110 | 000 011 101 110 | 000 011 101 110 | 000 011 101 110 | 000 011 101 110 | 001 010 100 111 | 000 | 001 | 0 | 0 |
| 000 011 101 110 | 000 011 101 110 | 000 011 101 110 | 000 011 101 110 | 001 010 100 111 | 000 011 101 110 | 000 | 010 | 0 | 0 |
| 000 011 101 110 | 000 011 101 110 | 000 011 101 110 | 001 010 100 111 | 000 011 101 110 | 000 011 101 110 | 000 | 100 | 1 | 1 |
| 000 011 101 110 | 000 011 101 110 | 000 011 101 110 | 001 010 100 111 | 001 010 100 111 | 001 010 100 111 | 000 | 111 | 1 | 1 |
| 000 011 101 110 | 001 010 100 111 | 001 010 100 111 | 000 011 101 110 | 000 011 101 110 | 001 010 101 111 | 011 | 001 | 0 | 0 |
| 000 011 101 110 | 001 010 100 111 | 001 010 100 111 | 000 011 101 110 | 001 010 101 110 | 000 010 101 110 | 011 | 010 | 0 | 0 |
| 000 011 101 110 | 001 010 100 111 | 001 010 100 111 | 001 010 100 111 | 000 010 101 110 | 000 010 101 110 | 011 | 100 | 1 | 1 |
| 000 011 101 110 | 001 010 100 111 | 001 010 100 111 | 001 010 100 111 | 001 010 100 111 | 001 010 100 111 | 011 | 111 | 1 | 1 |
| 001 010 100 111 | 000 011 101 110 | 001 010 100 111 | 000 011 101 110 | 000 011 101 110 | 001 010 100 111 | 101 | 001 | 1 | 1 |
| 001 010 100 111 | 000 011 101 110 | 001 010 100 111 | 000 011 101 110 | 001 010 100 111 | 000 011 101 110 | 101 | 010 | 1 | 1 |
| 001 010 100 111 | 000 011 101 110 | 001 010 100 111 | 001 010 100 111 | 000 011 101 110 | 000 011 101 110 | 101 | 100 | 0 | 0 |
| 001 010 100 111 | 000 011 101 110 | 001 010 100 111 | 001 010 100 111 | 001 010 100 111 | 001 010 100 111 | 101 | 111 | 0 | 0 |
| 001 010 100 111 | 001 010 100 111 | 000 011 101 110 | 000 011 101 110 | 000 011 101 110 | 001 010 100 111 | 110 | 001 | 1 | 1 |
| 001 010 100 111 | 001 010 100 111 | 000 011 101 110 | 000 011 101 110 | 001 010 100 111 | 000 011 101 110 | 110 | 010 | 1 | 1 |

TABLE 3 – Continued

| X 1–3 | X 4–6 | X 7–9 | Y 1–3 | Y 4–6 | Y 7–9 | P 1–3 | Q 1–3 | A 10 | A 11 |
|---|---|---|---|---|---|---|---|---|---|
| | | | CODE SPACE ($16 \times 4^6$) | | | | | | |
| {001, 010, 100, 111} | {001, 010, 100, 111} | {000, 011, 101, 110} | {001, 010, 100, 111} | {000, 010, 100, 111} | {000, 011, 101, 110} | 110 | 100 | 0 | 0 |
| {001, 010, 100, 111} | {001, 010, 100, 111} | {000, 011, 101, 110} | {001, 010, 100, 111} | {001, 010, 100, 111} | {001, 010, 100, 111} | 110 | 111 | 0 | 0 |

Repeat the error codes by interchanging (X,P) with (Y,Q) to obtain the remaining $16 \times 4^6$ combinations of error codes.

It will be appreciated that a similar arrangement can be constructed for even parity data paths, by one of average skill in the art using the teachings of this invention.

Although the inputs X1–X9 and Y1–Y9 are each divided into three equal groups in the preferred embodiment, it will be appreciated that any grouping can be selected so long as at least one input from each data path X and Y is applied to each XOR tree, so that each data path X and Y affects both outputs A10 and A11. The number of circuits required and the total acceptable delay path will determine the selection.

Each XOR tree is fully exercised, during normal operation, and therefore fully tested by the various code message combinations.

Figure 2:
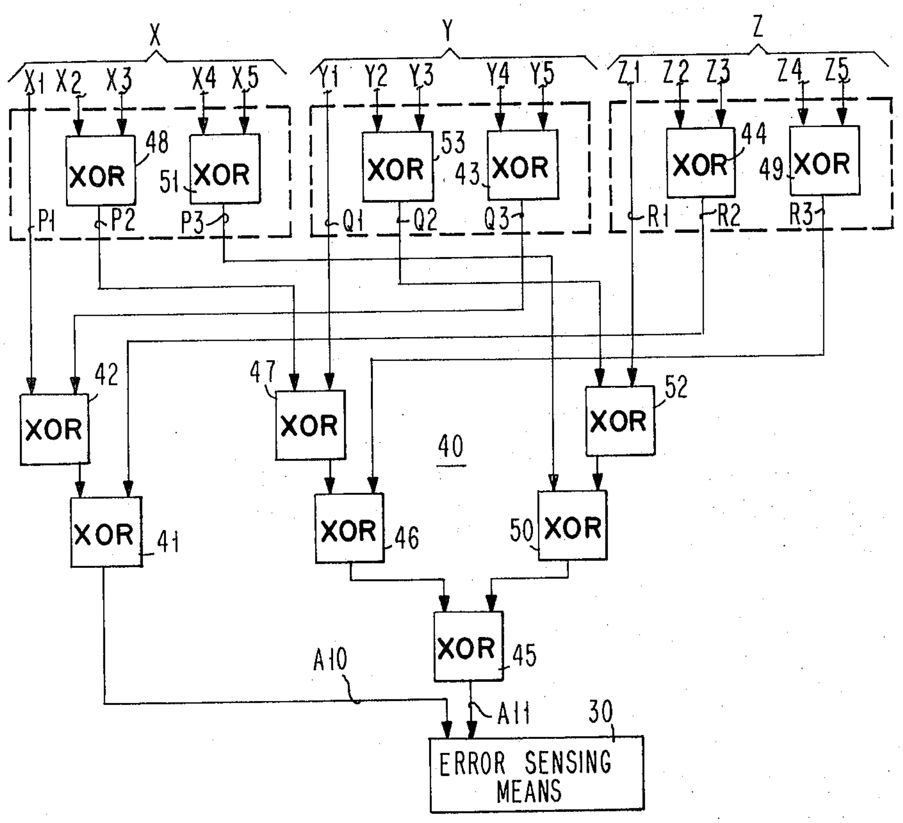

FIG. 2 illustrates a preferred form of self-checking parity error checker 40 for three independent data paths X, Y, Z, each having four data bits and one parity bit. Inputs X1, Y4, Y5 and Z2, Z3 are applied to one XOR tree comprising XOR circuits 41-44 to produce output A10. Inputs X2–X5, Y1–Y3, Z1, Z4, Z5 are applied to the other XOR tree comprising XOR circuits 45–53 to produce output A11. Intermediate output P1 is produced by input X1; P2 by X2, X3 via XOR 48; P3 by X4, X5 via XOR 51; Q1 by Y1; Q2 by Y2, Y3 via XOR 53; Q3 by Y4, Y5 via XOR 43; R1 by Z1; R2 by Z2, Z3 via XOR 44; and R3 by Z4, Z5 via XOR 49. Odd parity checking is assumed.

Table 4 below illustrates the circuit response of the checker 40 of FIG. 2 to all possible correct code patterns of P1–P3, Q1–Q3 and R1–R3 to produce correct code output signals 01 and 10 for outputs A10, A11.

TABLE 4

| | P1 | P2 | P3 | Q1 | Q2 | Q3 | R1 | R2 | R3 | A10 | A11 |
|---|---|---|---|---|---|---|---|---|---|---|---|
| | 0 | 0 | 1 | 0 | 0 | 1 | 0 | 0 | 1 | 1 | 0 |
| | 0 | 0 | 1 | 0 | 0 | 1 | 0 | 1 | 0 | 0 | 1 |
| | 0 | 0 | 1 | 0 | 0 | 1 | 1 | 0 | 0 | 1 | 0 |
| | 0 | 0 | 1 | 0 | 0 | 1 | 1 | 1 | 1 | 0 | 1 |
| | 0 | 0 | 1 | 0 | 1 | 0 | 0 | 0 | 1 | 0 | 1 |
| | 0 | 0 | 1 | 0 | 1 | 0 | 0 | 1 | 0 | 1 | 0 |
| | 0 | 0 | 1 | 0 | 1 | 0 | 1 | 0 | 0 | 0 | 1 |
| CODE SPACE | 0 | 0 | 1 | 0 | 1 | 0 | 1 | 1 | 1 | 1 | 0 |
| | 0 | 0 | 1 | 1 | 0 | 0 | 0 | 0 | 1 | 0 | 1 |
| | 0 | 0 | 1 | 1 | 0 | 0 | 0 | 1 | 0 | 1 | 0 |
| | 0 | 0 | 1 | 1 | 0 | 0 | 1 | 0 | 0 | 0 | 1 |
| | 0 | 0 | 1 | 1 | 0 | 0 | 1 | 1 | 1 | 1 | 0 |
| | 0 | 0 | 1 | 1 | 1 | 1 | 0 | 0 | 1 | 1 | 0 |
| | 0 | 0 | 1 | 1 | 1 | 1 | 0 | 1 | 0 | 0 | 1 |
| | 0 | 0 | 1 | 1 | 1 | 1 | 1 | 0 | 0 | 1 | 0 |
| | 0 | 0 | 1 | 1 | 1 | 1 | 1 | 1 | 1 | 0 | 1 |
| | 0 | 1 | 0 | 0 | 0 | 1 | 0 | 0 | 1 | 1 | 0 |
| | 0 | 1 | 0 | 0 | 0 | 1 | 0 | 1 | 0 | 0 | 1 |
| | 0 | 1 | 0 | 0 | 0 | 1 | 1 | 0 | 0 | 1 | 0 |
| | 0 | 1 | 0 | 0 | 0 | 1 | 1 | 1 | 1 | 0 | 1 |
| | 0 | 1 | 0 | 0 | 1 | 0 | 0 | 0 | 1 | 0 | 1 |
| | 0 | 1 | 0 | 0 | 1 | 0 | 0 | 1 | 0 | 1 | 0 |
| | 0 | 1 | 0 | 0 | 1 | 0 | 1 | 0 | 0 | 0 | 1 |
| | 0 | 1 | 0 | 0 | 1 | 0 | 1 | 1 | 1 | 1 | 0 |
| | 0 | 1 | 0 | 1 | 0 | 0 | 0 | 0 | 1 | 0 | 1 |
| | 0 | 1 | 0 | 1 | 0 | 0 | 0 | 1 | 0 | 1 | 0 |
| | 0 | 1 | 0 | 1 | 0 | 0 | 1 | 0 | 0 | 0 | 1 |
| | 0 | 1 | 0 | 1 | 0 | 0 | 1 | 1 | 1 | 1 | 0 |
| | 0 | 1 | 0 | 1 | 1 | 1 | 0 | 0 | 1 | 1 | 0 |
| CODE SPACE | 0 | 1 | 0 | 1 | 1 | 1 | 0 | 1 | 0 | 0 | 1 |
| | 0 | 1 | 0 | 1 | 1 | 1 | 1 | 0 | 0 | 1 | 0 |
| | 0 | 1 | 0 | 1 | 1 | 1 | 1 | 1 | 1 | 0 | 1 |
| | 1 | 0 | 0 | 0 | 0 | 1 | 0 | 0 | 1 | 0 | 1 |
| | 1 | 0 | 0 | 0 | 0 | 1 | 0 | 1 | 0 | 1 | 0 |
| | 1 | 0 | 0 | 0 | 0 | 1 | 1 | 0 | 0 | 0 | 1 |
| | 1 | 0 | 0 | 0 | 0 | 1 | 1 | 1 | 1 | 1 | 0 |

TABLE 4 – Continued

| | P1 | P2 | P3 | Q1 | Q2 | Q3 | R1 | R2 | R3 | A10 | A11 |
|---|---|---|---|---|---|---|---|---|---|---|---|
| | 1 | 0 | 0 | 0 | 1 | 0 | 0 | 1 | 0 | 0 | 1 |
| | 1 | 0 | 0 | 0 | 1 | 0 | 1 | 0 | 0 | 1 | 0 |
| | 1 | 0 | 0 | 0 | 1 | 0 | 1 | 1 | 1 | 0 | 1 |
| | 1 | 0 | 0 | 1 | 0 | 0 | 0 | 0 | 1 | 1 | 0 |
| | 1 | 0 | 0 | 1 | 0 | 0 | 0 | 1 | 0 | 0 | 1 |
| | 1 | 0 | 0 | 1 | 0 | 0 | 1 | 0 | 0 | 1 | 0 |
| | 1 | 0 | 0 | 1 | 0 | 0 | 1 | 1 | 1 | 0 | 1 |
| | 1 | 0 | 0 | 1 | 1 | 1 | 0 | 0 | 1 | 0 | 1 |
| | 1 | 0 | 0 | 1 | 1 | 1 | 0 | 1 | 0 | 1 | 0 |
| | 1 | 0 | 0 | 1 | 1 | 1 | 1 | 0 | 0 | 0 | 1 |
| | 1 | 0 | 0 | 1 | 1 | 1 | 1 | 1 | 1 | 1 | 0 |
| | 1 | 1 | 1 | 0 | 0 | 1 | 0 | 0 | 1 | 0 | 1 |
| | 1 | 1 | 1 | 0 | 0 | 1 | 0 | 1 | 0 | 1 | 0 |
| | 1 | 1 | 1 | 0 | 0 | 1 | 1 | 0 | 0 | 0 | 1 |
| | 1 | 1 | 1 | 0 | 0 | 1 | 1 | 1 | 1 | 1 | 0 |
| | 1 | 1 | 1 | 0 | 1 | 0 | 0 | 0 | 1 | 1 | 0 |
| CODE | 1 | 1 | 1 | 0 | 1 | 0 | 0 | 1 | 0 | 0 | 1 |
| SPACE | 1 | 1 | 1 | 0 | 1 | 0 | 1 | 0 | 0 | 1 | 0 |
| | 1 | 1 | 1 | 0 | 1 | 0 | 1 | 1 | 1 | 0 | 1 |
| | 1 | 1 | 1 | 1 | 0 | 0 | 0 | 0 | 1 | 0 | |
| | 1 | 1 | 1 | 1 | 0 | 0 | 0 | 1 | 0 | 0 | 1 |
| | 1 | 1 | 1 | 1 | 0 | 0 | 1 | 0 | 0 | 1 | 0 |
| | 1 | 1 | 1 | 1 | 0 | 0 | 1 | 1 | 1 | 0 | 1 |
| | 1 | 1 | 1 | 1 | 1 | 1 | 0 | 0 | 1 | 0 | 1 |
| | 1 | 1 | 1 | 1 | 1 | 1 | 0 | 1 | 0 | 1 | 0 |
| | 1 | 1 | 1 | 1 | 1 | 1 | 1 | 0 | 0 | 0 | 1 |
| | 1 | 1 | 1 | 1 | 1 | 1 | 1 | 1 | 1 | 1 | 0 |

Error Code P1, P2, P3 XOR Q1, Q2, Q3 XOR R1, R2, R3 = {000, 011, 101, 110}

It will be appreciated that other groupings of X1-X5, Y1-Y5, Z1-Z5 can be selected for constructing the two XOR trees having outputs A10, A11. It is necessary to have at least one input from each data path X, Y, Z coupled to each XOR tree so as to affect both outputs A10 and A11.

Figure 3:
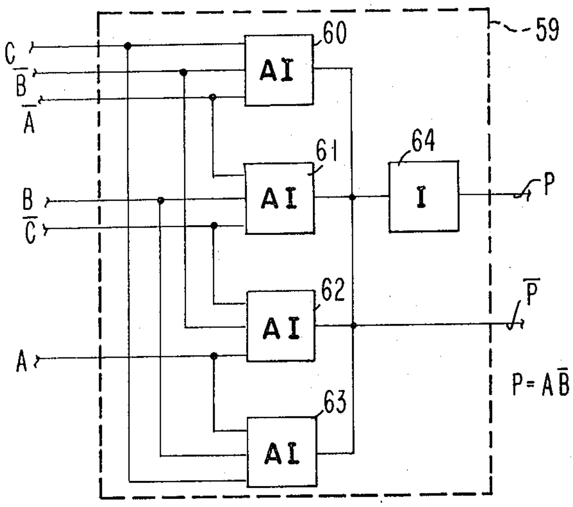
FIG. 3 is a schematic diagram of a three-input two-output XOR circuit.

FIG. 3 illustrates a three-way XOR circuit 59 for two-rail data comprising AND-INVERT circuits 60–63, the outputs of which are ORed and applied to INVERT circuit 64. Complementary outputs P and P are produced by complementary inputs A, A, B, B, C, C. An odd number of logical 1 true inputs (A, B, C) produce a logical 1 true output (i.e., $P = 1$). Although circuit 59 has six physical inputs, it is commonly referred to as a three-way XOR circuit because the true and complement values of three variables form the inputs. The term "three-way XOR circuit" as used in the claims refers to this circuit 59 and its equivalents.

Figure 4:
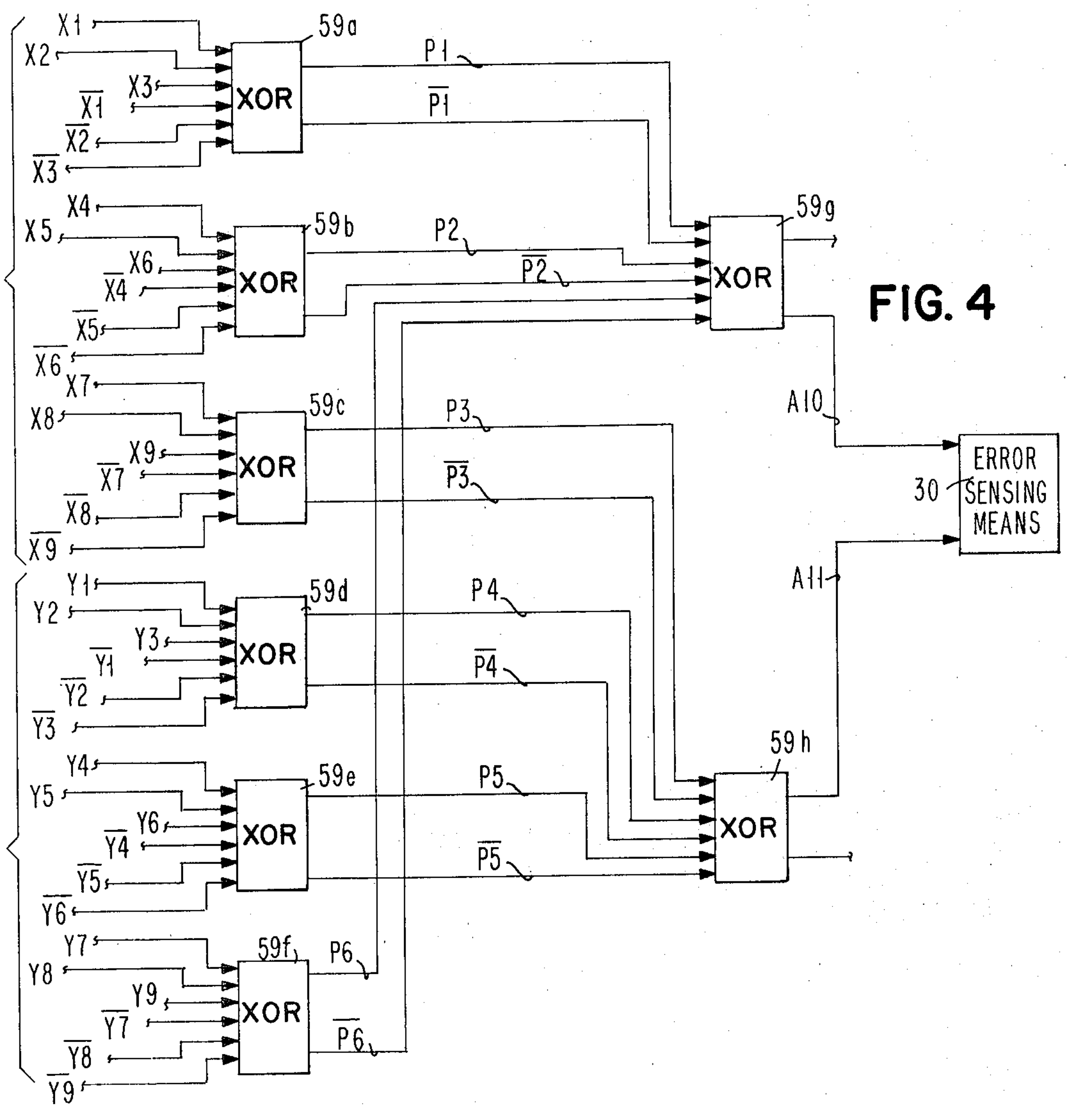
FIG. 4 is a schematic diagram of an alternative embodiment for two independent data sets utilizing the XOR circuit of FIG. 3.

FIG. 4 illustrates a preferred embodiment of a checker for the data paths X and Y of FIG. 1 where two-rail (i.e. complementary lines for each bit) data is used. Each of the logic circuits *59a–59h* is the same as circuit 59 of FIG. 3. Output A10 is the complement output of circuit *59g* whereas A11 is the true output of circuit *59h*.

Circuits 59a, 59b and 59f produce intermediate outputs P1, P1, P2, P2 and P6, P6 which form outputs to circuit 59g. Circuits *59c*, *59d* and *59e* produce intermediate outputs P3, P3, P4, P4, P5, P5 which form inputs to circuit *59h*. Correct code and nonfailure circuit operation produce logical signals of 01 or 10 at outputs A10 and A11. Error code or circuit failure causes logical signals of 00 or 11 at outputs A10 and A11.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A self-testing error-checking circuit for checking independent parity coded binary data appearing on each of a plurality of nonoverlapping sets of data lines, said checking circuit comprising:

a pair of Exclusive-OR logic trees, each tree having only one output and each having inputs selectively connected to different data lines of each set for producing a first data configuration when the parity coded data of both sets is correct and the checking circuit is producing no error and for producing a second data configuration when a single error is present in either the parity coded data sets or in the operation of the checking circuit, and means connected to said outputs for sensing said second data configuration.

2. The checking circuit of claim 1 for checking two sets of nine data lines, each data line set being divided into three distinct nonoverlapping groups, one of said logic trees being connected to one of said groups of one data line set and to two of said groups of the other data line set, the other of said logic trees being connected to the other two groups of said one data line set and to the other group of said other data line set.

3. The checking circuit of claim 2 wherein the logic trees are comprised of two-input, single output Exclusive-OR circuits and an invert circuit.

4. The checking circuit of claim 1 for checking three sets of data lines, each set being divided into three distinct nonoverlapping groups, one of said logic trees being connected to one of said groups of each data line set, the other of said logic trees being connected to the remaining two groups of each data line set.

5. The checking circuit of claim 4 wherein the logic trees are comprised of two-input, single output Exclusive-OR circuits.

6. A self-testing error checking circuit for checking two-rail parity coded binary data appearing on two independent sets of eighteen data lines, each of said data line sets being divided into three equal distinct nonoverlapping groups, said checking circuit comprising:

a logic circuit means selectively connected to each group of data lines, each said logic circuit means performing the function of a three-way Exclusive-OR circuit means for producing complementary binary outputs from each of said logic circuit means, first and second additional logic circuit means each for performing a three-way Exclusive-OR function and having a plurality of inputs and a single output, means coupling the inputs of the first additional logic circuit means to the true and complement outputs of two of the logic circuit means coupled to the first data line set groups and of one of the logic circuit means coupled to the second data line set groups, and means coupling the inputs of the second additional logic circuit means to the true and complement outputs of the other two of the logic circuit means coupled to the second data line set groups and of the other one of the logic circuit means coupled to the first data line set groups, the two binary outputs from said additional two logic circuit means having a first predetermined data configuration when the parity coded binary data is correct and the checking circuit is producing no error and having a second predetermined data configuration when a single error is present in either the parity coded data or in the operation of the checking circuit.

7. The checking circuit of claim 6 fabricated on a single semiconductor chip, whereby only two output pins are required for the checking circuit.

8. The checking circuit of claim 7 further comprising:

means external to the chip connected to said outputs of the additonal logic circuit means for sensing an error condition, said latter means possessing the characteristic of tolerating a single failure without producing an error.

* * * * *

PO-1050
(5/69)

UNITED STATES PATENT OFFICE
CERTIFICATE OF CORRECTION

Patent No. 3,825,894 Dated July 23, 1974

Inventor(s) Allen M. Johnson, Jr.

It is certified that error appears in the above-identified patent and that said Letters Patent are hereby corrected as shown below:

Column 6, TABLE 2, under the last column heading "All", the third digit from the top should read --0-- instead of "o"; the seventh digit from the top should read --0-- instead of "o"; the fourteenth digit from the top should read --0-- instead of "o"; a line should be drawn between the sixteenth row of numbers reading "1 1 1 1 1 1 0 1" and the seventeenth row of numbers reading "0 0 0 0 X X 0 0", reading down from the top of the table, to distinguish between Code Space and Error Code.

Column 6, TABLE 3, under the last column heading "All", the third digit from the top should read --0-- instead of "o".

Column 9, under TABLE 3 - Continued, the subtitle should read --ERROR CODE ($32 \times 4^6$)-- instead of "CODE SPACE ($16 \times 4^6$)".

Column 11, under TABLE 4 - Continued, the uppermost row of digits is missing and should read as follows: --1 0 0 0 1 0 0 0 1 1 0--; the twenty-first row of digits from the top of the table (including the missing uppermost row) should read --1 1 1 1 0 0 0 0 1 1 0-- instead of "1 1 1 1 0 0 0 0 1 0".

Signed and sealed this 26th day of November 1974.

(SEAL)
Attest:

McCOY M. GIBSON JR.
Attesting Officer

C. MARSHALL DANN
Commissioner of Patents